(12) United States Patent
Crosby, Jr.

(10) Patent No.: US 6,357,546 B1
(45) Date of Patent: Mar. 19, 2002

(54) MOTORCYCLE SUSPENSION SYSTEM

(76) Inventor: James A. Crosby, Jr., 1133 W. Brooks #B, Ontario, CA (US) 91762

(*) Notice: Subject to any disclaimer, the term of this patent is extended or adjusted under 35 U.S.C. 154(b) by 0 days.

(21) Appl. No.: 09/722,162

(22) Filed: May 29, 2001

(51) Int. Cl.[7] ............................................. B62D 61/02
(52) U.S. Cl. ............. 180/227; 280/284; 280/124.158; 267/64.13
(58) Field of Search ................. 180/219, 227, 180/218, 358; 280/283, 284, 124.1, 124.157, 124.158, 124.159, 124.16; 267/64.11, 64.13, 64.19, 64.23, 64.25

(56) References Cited

U.S. PATENT DOCUMENTS

| | | | |
|---|---|---|---|
| 3,866,894 A | * 2/1975 | Sweet et al. | 267/31 |
| 5,201,384 A | 4/1993 | Kiyota et al. | 180/219 |
| 5,348,112 A | 9/1994 | Vaillancourt | 180/227 |
| 5,469,930 A | * 11/1995 | Wiers | 180/227 |
| 5,487,443 A | * 1/1996 | Thurm | 180/227 |
| 5,749,591 A | * 5/1998 | Thurm | 180/227 X |
| 6,003,628 A | 12/1999 | Jurrens et al. | 180/227 |
| 6,123,165 A | * 9/2000 | Smith | 180/227 |
| 6,193,005 B1 | * 2/2001 | Jurrens | 180/227 |
| 6,290,017 B1 | * 9/2001 | Ito | 180/219 X |

* cited by examiner

Primary Examiner—J. J. Swann
Assistant Examiner—F. Zeender
(74) Attorney, Agent, or Firm—Lewis M Brande; Thomas A. McCleary; Brande & McCleary

(57) ABSTRACT

A motorcycle suspension using an air bag in place of a spring, having a front bag bracket that is fixed to the motorcycle main frame and a pivoting rear bag bracket that is attached to a swing arm of a motorcycle. An air bag is sandwiched between the front bag bracket and the rear bag bracket and is compressed and extended with the action of the rear bag bracket and the swing arm. A shock absorber is mounted in its conventional place and dampens the motions of the swing arm and the rear bag bracket. The air bag is capable of being inflated or deflated by the driver either while driving or stationary. The front bag bracket and rear bag bracket are pivotably attached to the main frame of the motorcycle with a common pivot axis, allowing a scissor like motion, which allows the suspension to react in a conventional manner.

4 Claims, 4 Drawing Sheets

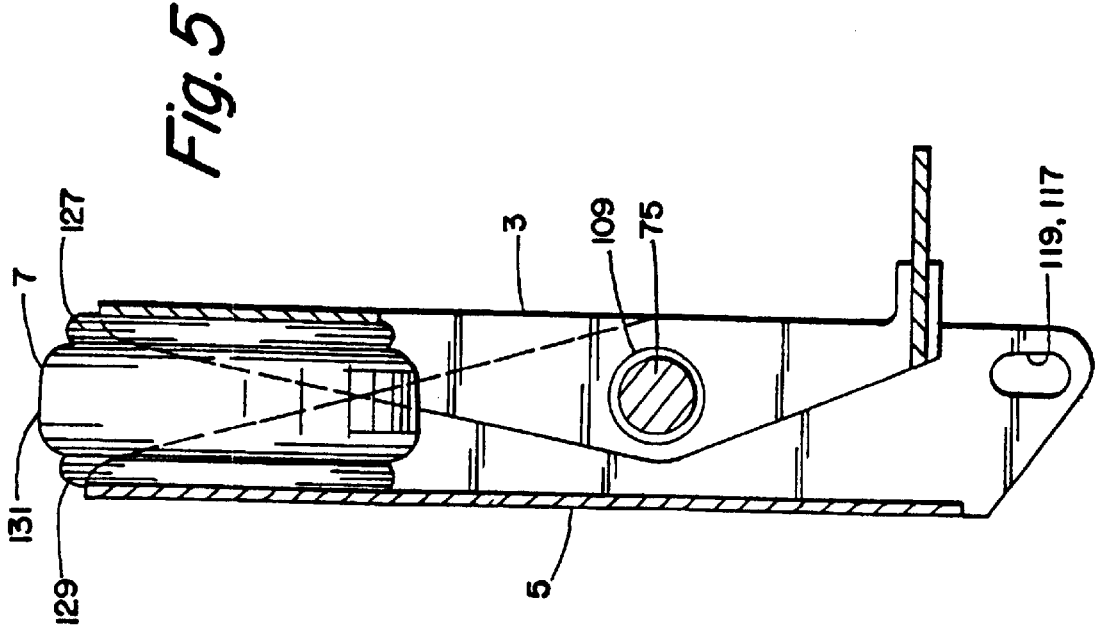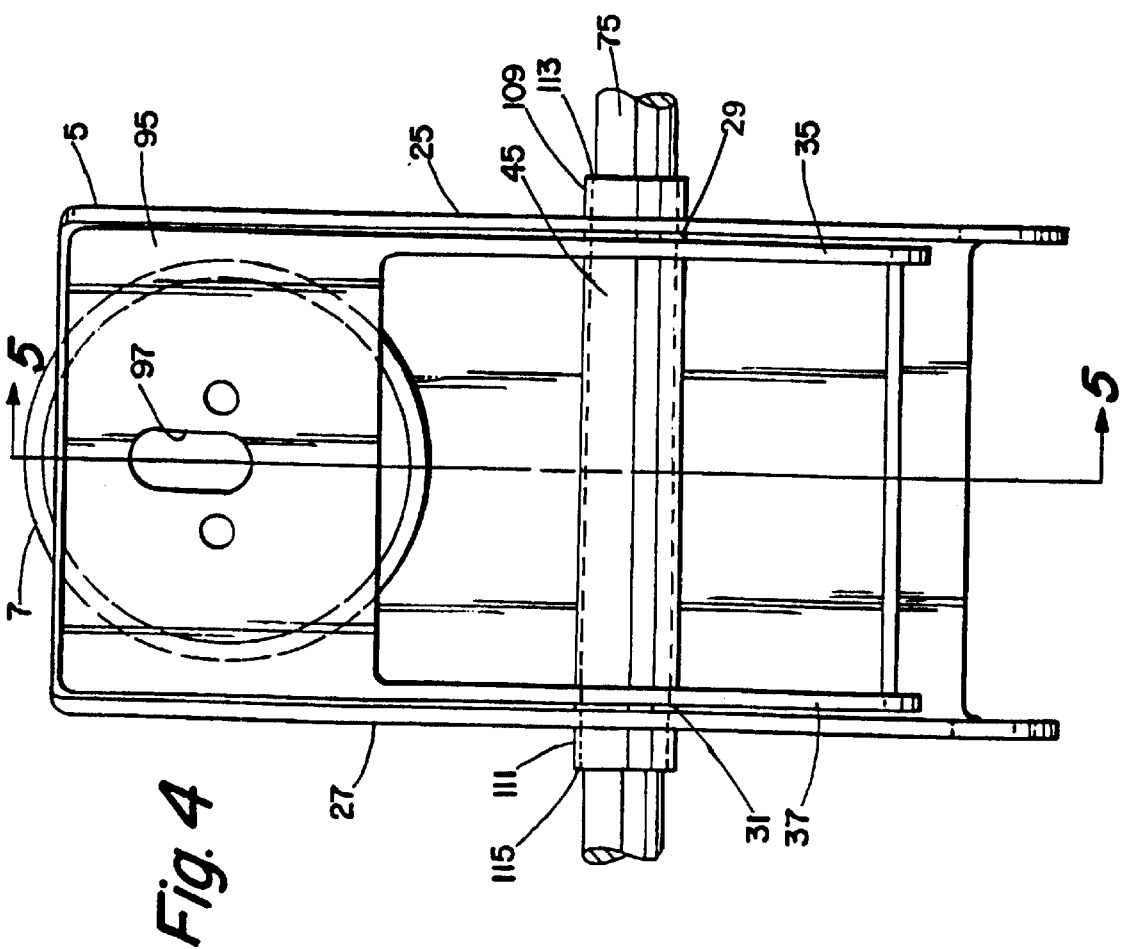

MOTORCYCLE SUSPENSION SYSTEM

BACKGROUND OF THE INVENTION

1. Field of the Invention

This invention defines a new and improved style of motorcycle suspension system to be used on motorcycles that use swing-arm type suspension systems.

2. Description of the Prior Art

The use of air-bags in suspension systems for Harley Davidson® type of motorcycles is known in the prior art.

The Harley Davidson® SOFTAIL® motorcycle suspension system uses a swing arm that is pivotally attached to the struts of the motorcycle main frame. This allows the rear wheel assembly to move independently from the frame about a singular pivot point. The swing arm rotates about a pivot and allows the wheel to move in an arcuate motion. The swing arm has a pair of wheel mounts that are positioned and spaced to mount a wheel assembly and provide proper orientation and location for the wheel relative to the motorcycle. The swing arm has a pair of supports at each wheel mount, each pair are positioned in a plane and radiate from the wheel mount to a support member that connects the pair of supports in a planar like orientation. Transverse bars, or cross members link each of the wheel mounts an upper location and a lower location providing proper spacing and structural rigidity for the swing arm. At an intermediate position, positioned between the upper and lower cross members, an additional transverse bar or cross member links each wheel mount. The intermediate cross member is tubular, and provides an axis for the swing arm to rotate about. Each of the support members have a hole that coincides with the tubular shaped cross member, providing a through-hole for pivot bolts to be inserted therethrough. Each support member is positioned adjacent to, and located inside the frame and are therefore hidden by the main frame struts, giving the illusion of a motorcycle having no visible suspension system.

The standard or stock SOFTAIL® motorcycles uses a suspension system that incorporates two shock absorbers that are positioned in a parallel relationship to each other and are orientated so the longitudinal axis of the shock absorbers is parallel to the direction of travel of the motorcycle. One end of each of the shock absorbers is attached to the main frame. The other end of each of the shock absorbers is connected to a member that extends forward from the lower cross member of the swing arm. The main frame of the motorcycle hides the shock mounts from view, maintaining the appearance of the SOFTAIL® motorcycle.

The problem with existing suspension systems for the SOFTAIL® motorcycles is that the relative arcuate travel of the swing arm is usually greater than the allowable travel of the shock absorbers. This results in a harsh ride, since the current state of shock absorbers precludes rapid change in direction due to the fluid in the shock absorber (internal drag), as well as inertial drag caused by the action of the shock absorber.

U.S. Pat. No. 6,003,628 (hereinafter the 628 patent) describes the use of an airbag as a replacement for the spring in the coil-over shock used in standard Harley Davidson® SOFTAIL® motorcycles. The 628 patent describes the use of at least one elastomeric air bag that is housed within a slideable housing, where one end is attached to the main frame of the motorcycle and is pivotally attached at it's rear position to the lower cross member of the swing arm. Slide rods are also attached to the forward portion of the slideable housing and are allowed to slide within a pair of bushings. As the swing arm moves upward in its arcuate motion, the slideable air bag housing is drawn rearward, causing the slide bars to draw the housing rearward, compressing the air bags. Opposing motion causes the slide bars to push the housing forward, extending the air bags. The air bags are adjustable using an air compressor mounted on the motorcycle to regulate the ride height, which also regulates the harshness of the ride.

The main problem with the 628 design is the inherent complexity of the sliding mechanism. The mechanism requires a reversal of the action of the swing arm in order to provide for the correct translation of the mechanism which will result in a compression of the air bag springs, and on reversal extension of the air bags. Additionally, the preferred embodiment of the invention advises the elimination of the shock absorber, which tends to allow the suspension to oscillate in its arcuate motion without any damping, resulting in an undesirable ride.

SUMMARY OF THE INVENTION

The suspension system of a Harley Davidson® SOFTAIL® motorcycle consists of a main frame, and a swing arm that is pivotably mounted about a longitudinal axis to the main frame. A front bag bracket is fixed to the main frame, and has a hole that allows a swing arm axis tube that penetrates the front air bag bracket and positions the front air bracket relative to the longitudinal axis. A rear bag bracket permits the swing arm axis tube to pivot about the longitudinal axis. The rear bag bracket is attached to a shock absorber and the swing arm at the lower portion of the bracket and arcuately travels with the swing arm in its relative motion. An air bag is attached between the front bag bracket and the rear bag bracket and by inflating the air bag, raises the ride height of the motorcycle. Conversely, deflating the air bag lowers the ride height of the motorcycle. The air bag is connected to an air compressor, where the air compressor has a means to regulate inflation and deflation of the airbag by the driver.

In the preferred embodiment, inflation of the airbag causes a scissors like motion between the front air bracket and the rear air bracket where the air bag compresses when weight is applied to the motorcycle. The air bag suspension acts like a standard automotive type spring and shock system, which will greatly improve the ride of the motorcycle on all types of terrain.

It is an object of the invention to create a suspension system that will not require modification of components of the existing Harley Davidson® SOFTAIL® mainframe or swing arm.

It is another object of the invention to allow easy regulation of the ride height and ride stiffness of the motorcycle while either stationary or being driven.

Other objects, advantages, and novel features of the present invention will be come apparent from the following detailed description of the invention when considered in conjunction with the drawings accompanying the patent.

BRIEF DESCRIPTION OF THE DRAWINGS

FIG. one (1) depicts an exploded view of the components of the frame and suspension components.

FIG. two (2) shows an exploded view of the components of the spring suspension components and shock absorber(s) of the suspension FIG. three (3) shows the air bag suspension mounted in the motorcycle, attached to the mainframe and the swing arm.

Figure 1:
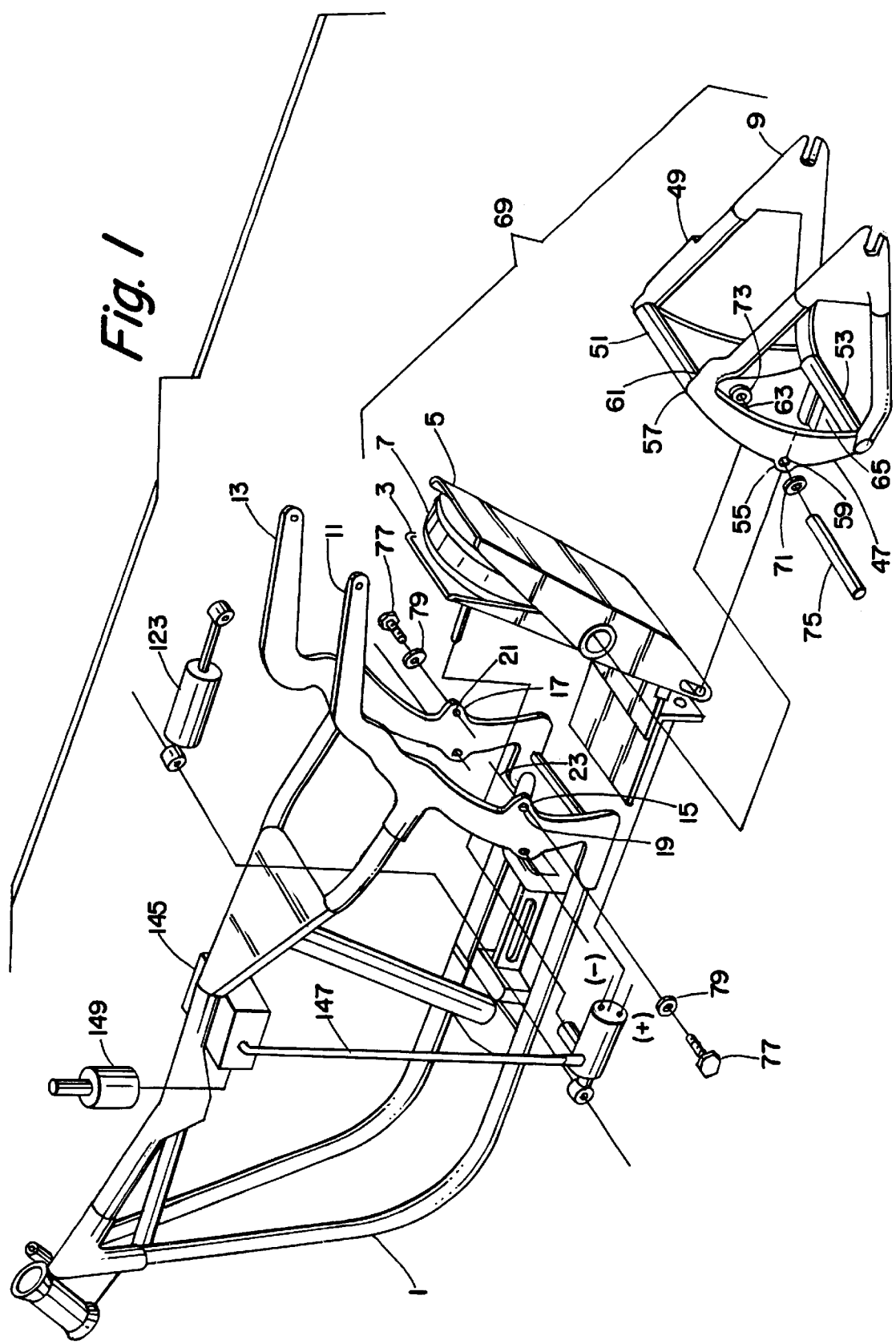
Figure 2:
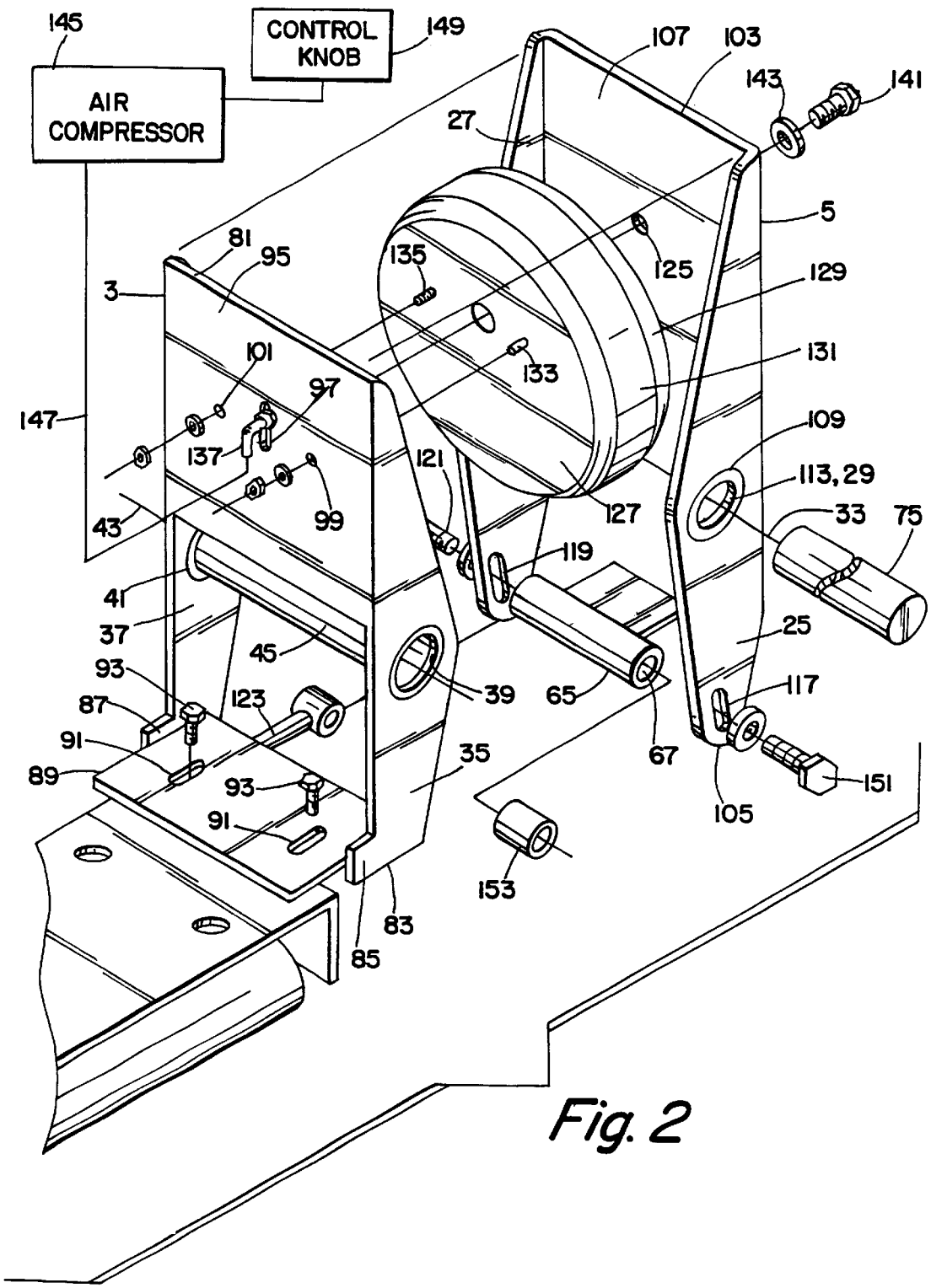
Figure 3:
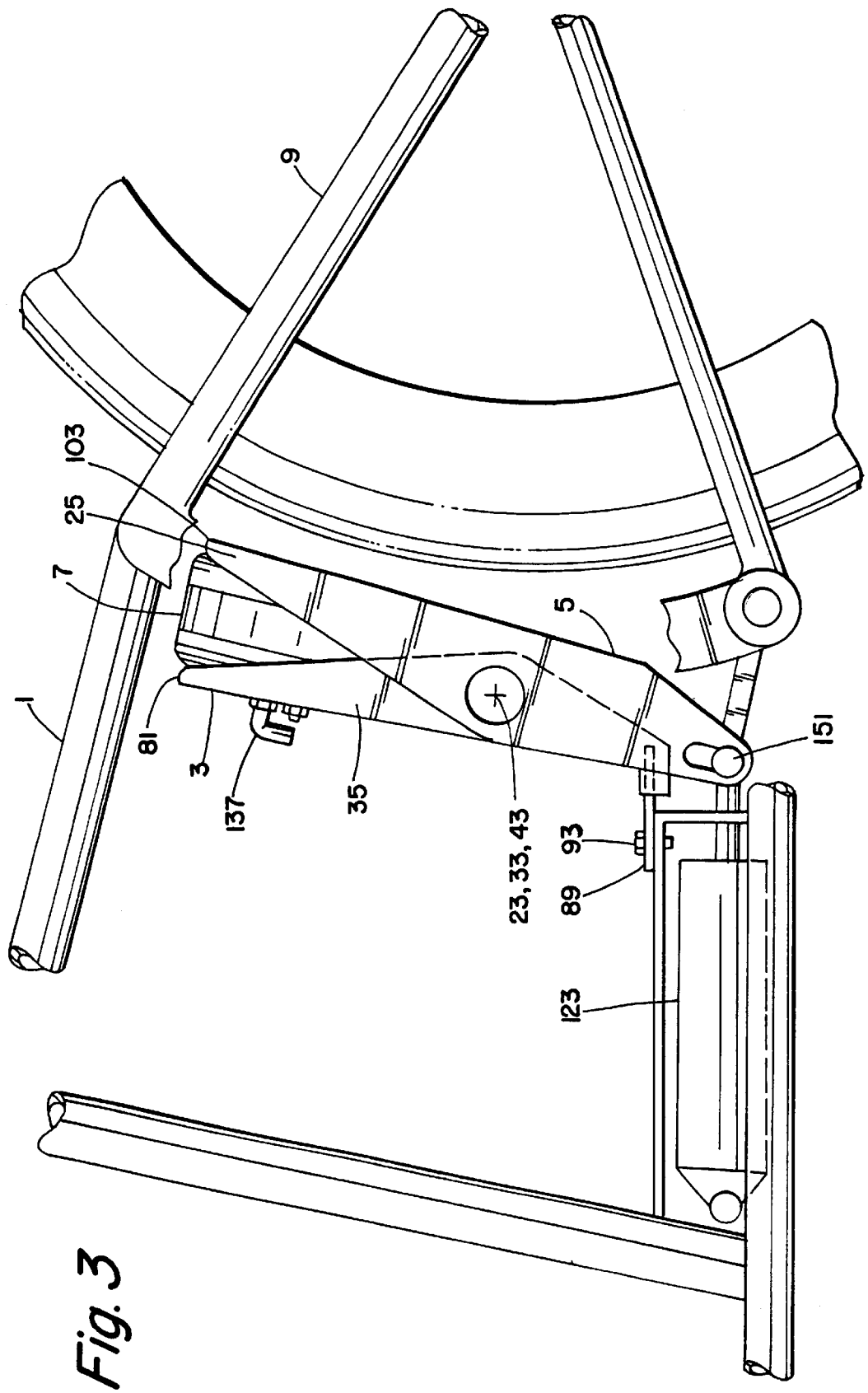

FIG. four (4) shows a plan view of the spring suspension components.

FIG. five (5) shows a cross-sectional view of the spring suspension components.

DETAILED DESCRIPTION

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

With respect to FIG. one (1) and FIG. two (2), a main frame (1) for a Harley Davidson® SOFTAIL® is shown. At the rear of the main frame (1) a first hanger (11), and a second hanger (13) are mounted opposing each other in a parallel relationship. The first hanger (11) and the second hanger (13) are supported by the main frame (1) so as to provide a solid and stable mount point for a swing arm (9). The first hanger (11) has a first lug (15) mounted thereon, where the first lug (15) is positioned towards the rear of the main frame (1). The first lug (15) has a first hole (19) penetrating therethrough. The second hanger (13) has a second lug (17) mounted thereon, where the second lug (17) is positioned towards the rear of the main frame (1), and is in a parallel and coaxial relationship to the first lug (15). The second lug (17) has a second hole (19) penetrating therethrough where the first hole (19) and the second hole (19) define a first longitudinal axis or first pivot axis (23).

A rear bag bracket (5) is shown with a first flange (25) and a second flange (27) where the first flange (25) and the second flange (27) are disposed in a parallel relationship and are positioned flanged towards the front of the main frame (1). The first flange (25) has a third hole (29) penetrating therethrough and the second flange (27) has a fourth hole (31) penetrating therethrough. The third hole (29) and the fourth hole (31) are located towards a medial position within the first flange (25) and the second flange (27), where the third hole (29) and the fourth hole (31) define a second longitudinal axis or second pivot axis (33) defined therebetween.

A front bag bracket (3) is shown with a third flange (35) and a fourth flange (37) where the third flange (35) and the fourth flange (37) are disposed in a parallel relationship and are positioned flanged towards the rear of the main frame (1). The third flange (35) has a fifth hole (39) penetrating therethrough and the fourth flange (37) has a sixth hole (41) penetrating therethrough. The fifth hole (39) and the sixth hole (41) are located towards a medial position within the third flange (35) and the fourth flange (37), where the fifth hole (39) and the sixth hole (41) define a third longitudinal axis or third pivot axis (43) defined therebetween. A front bag axis tube (45) is shown attached to the third flange (35) and the fourth flange (37) allowing the fifth hole (39) to communicate with the sixth hole (41). The front bag axis tube (45) is positioned co-incident with the third pivot axis (43). The third flange (35) and the fourth flange (37) of the front bag bracket (3) are disposed between the first flange (25) and the second flange (27) of the rear bag bracket (5) and are positioned so the second pivot axis (33) and the first pivot axis (23) are co-incident providing an axial pivotable penetration therethrough, and provides easy pivotable and arcuate motion.

A swing arm (9) has a first side (47) and a second side (49) where the first side (47) and the second side (49) are in a parallel relationship and are maintained in the parallel relationship by an upper support (51) and a lower support (53). The first side (47) of the swing arm (9) and the second side (49) of the swing arm (9) are essentially flat. A first boss (55) is mounted on the first side (47) of the swing arm (9), and a second boss (57) is mounted on the second side (49) of the swing arm. The first boss (55) and the second boss (57) are positioned midway between the upper support (51) and the lower support (53) and are projected slightly forward positioning the first boss (55) and the second boss (57) towards the front of the swing arm (9). The first boss (55) and the second boss (57) each have a hole (59) and (61) defined therein, where the hole (51) in the first boss (55) and the hole (61) in the second boss (57) are axially positioned creating a fourth longitudinal or pivot axis (63) therebetween. The first flange (25) and the second flange (27) of the rear bag bracket (5) are disposed between the first side (47) and the second side (49) of the swing arm (9) and are positioned so the fourth pivot axis (63), the third pivot axis (43), and the second pivot axis (23) are co-incident providing an axial pivot axis therethrough. The lower support (53) has a swing arm mount (65) projecting towards the front of the swing arm (9) where the swing arm mount (65) has a threaded hole (67) defined therethrough. The swing arm mount (65) is disposed to fit between the first flange (25) and the second flange (27) of the rear bag bracket (5). The swing arm (9) has standard attach means (155) provided for a standard motorcycle tire assembly.

With respect to figure two, a detailed view of the front bag bracket (3) showing the orientation of the third flange (35) and the fourth flange (37). The front bag bracket (3) has a first top side (81) and a first bottom side (83). The third flange (35) and the fourth flange (37) are shown having an increasing taper from the first top side (81) having a maximum width at the third longitudinal axis (43). The third flange (35) and the fourth flange (37) then show a decreasing taper towards the first bottom side (83). A fifth flange (85) is shown attached to the third flange (35), and projects forward towards the front of the motorcycle. A sixth flange (87) is shown attached to the fourth flange (37), and also projects forward towards the front of the motorcycle, and maintains a parallel relationship to the fifth flange (85). A frame attach pad (89) is shown attached to the third flange (35), the fourth flange (37), the fifth flange (85), and the sixth flange (87) providing structural stability between the fifth flange (85) and the sixth flange (87). The frame attach pad has a pair of slots (91) defined therein allowing frame attach bolts (93) to penetrate therethrough and threadably attach to complementary holes in the main frame (1). The first top side (81) of the front bag bracket (3) has a first attach web (95) between the third flange (35) and the fourth flange (37) providing structural stability to the first top side (81) of the front bag bracket (3) while maintaining the parallel relationship between the third flange (35) and the fourth flange (37). The first attach web (95) has a central slot (97)defined therein. The first attach web (95) has a first bag attach hole (99) and a second bag attach hole (101) positioned on either side of the central slot (97).

A detailed view of the rear bag bracket (5) shows the first flange (25) and the second flange (27). The rear bag bracket (5) has a second top side (103) and a second bottom side (105). A second attach web (107) is shown attached to the first flange (25) and the second flange (27) maintaining the parallel relationship between the first flange (25) and the second flange (27). A third boss (109) is shown attached to the first flange (25). The third boss (109) has a seventh hole (113) defined therein and communicates with the third hole (29) in the first flange (25). A fourth boss (111) is attached to the second flange (27). The fourth boss (111) has an eighth hole (115) defined therein and communicates with the fourth hole (31) in the second flange (27). The first flange (25) and the second flange (27) are shown having an increasing taper from the second top side (103) having a maximum width at the second longitudinal axis (33), and then shows a decreasing taper having a minimum width at the second bottom side (105). The second bottom side (105) of the first flange (25) has a first shock attach slot (117) defined therein. The second bottom side (105) of the second flange (27) has a second shock attach slot (119) defined therein. A first standard bolt (121) is inserted through the second attach slot (119), through a shock absorber (123), and threadably inserted into the swing arm mount (65) on the swing arm (9), the shock absorber (123) being mounted on the right side of the main frame (1). The shock absorber (123) dampens the relative motions of the swing arm (9) and the rear bag bracket (5) when the motorcycle is driven. A third standard bolt (151) is inserted through the first shock attach slot (117), through a spacer (153) and threadably inserted into the swing arm mount (65) on the swing arm (9). The second top side (103) of the rear bag bracket (5) has a second attach web (107) positioned between the first flange (25) and the second flange (27). The second attach web (107) provides structural stability to the second top side (103) of the rear bag bracket (5) while maintaining the parallel relationship between the first flange (25) and the second flange (27). The second attach web (107) has a central hole (125) is defined therein.

An air bag (7) is shown disposed between the front bag bracket (3) and the rear bag bracket (5). A front pad (127) and a rear pad (129) of the air bag (7) are separated by, and attached to an elastomeric material (131). A first threaded stud (133) and a second threaded stud (135) are mounted on the front pad (127). The first threaded stud (133) and a second threaded stud (135) project forward from the front pad (127), and are inserted through the first bag attach hole (99) and the second bag attach hole (101) respectively. The air bag (7) is then fastened onto the front air bag bracket (3) by a pair of standard washers and nuts, allowing the air bag (7) to bear hard against the front bag bracket (3) firmly attaching the front bag bracket (3) to the air bag (7). An air fitting (137) such as an elbow, 45 degree, or straight line, is threadably fastened into the front pad (127) of the air bag (7) and is disposed through the central slot (97) located in the first attach web (95) of the front bag bracket (3). Centrally disposed on the rear pad (129) of the air bag (7) is a threaded hole (139). The threaded hole (139) is positioned to align with the central hole (125) located in the second attach web (107) of the rear bag bracket (5). A second standard bolt (141) is inserted through a second standard washer (143) and the second attach web (107) of the rear bag bracket (5), and is threadably inserted into the threaded hole (139) in the rear pad (129) of the air bag (7) allowing the rear pad (129) to bear hard against the second attach web (107) firmly attaching the rear bag bracket (5) to the air bag (7). The air bag (7) acts similar to a standard automotive suspension spring under compressive and extensive loading conditions.

A pivoting assembly (69), comprising the rear bag bracket (5), the front bag bracket (3), the air bag (7), and the swing arm (9) are positioned so the first pivot axis (23), located on the main frame (1) the second pivot axis (33) located on the rear bag bracket (5), the third pivot axis (43) located on the front bag bracket (3), and the fourth pivot axis (63) located on the swing arm (9) are positioned co-incident. A first washer (71) is placed between the first hanger (11) and the swing arm (9) with its hole in line with the first pivot axis (23). A second washer (73) is placed between the second hanger (13) and the swing arm (9) with its hole in line with the first pivot axis (23). The first washer (71), and the second washer (73) provide a smooth surface that allows for easy smooth pivotal motion about of the swing arm (9) when installed into the main frame (1). The first side (47) and the second side (49) of the swing arm (9) are disposed between the first hanger (11) and the second hanger (13) of the main frame (10). A swing arm axis tube (75) is inserted through the holes (55), (57) defined in the swing arm (9), the seventh hole (113) in the third boss (109) and the eighth hole (115) in the fourth boss (111) of the rear bag bracket (5), the fifth and sixth holes (39)(41) and the front bag axis tube (45) of the front bag bracket (3), the first hole (19) in the first lug (15) and the second hole (21) in the second lug (17) of the main frame (1) providing support for the pivoting assembly (69) of the suspension and also allowing the rear bag bracket (5) and the swing arm (9) to pivot about the swing arm axis tube (75). A pivot bolt (77) and lock washer (79) are fastened into each end of the swing arm axis tube (75) preventing the swing arm axis tube (75) from migrating loose, and thereby allowing the pivoting assembly (69) to freely pivot about the swing arm axis tube (75).

An air compressor (145) is shown attached to the main frame (1) on the side opposing the shock absorber (123). The air compressor (145) has an air line (147) attached to the air compressor (145) and the air fitting (137) attached to the air bag (7). A control means (149) is attached to the air compressor (145) and either inflates or deflates the air bag (7) according to the driver's wishes.

Figure three shows the relative positions of the major components assembled onto the motorcycle. The front bag bracket (3) is shown attached to the main frame (1). The front bag bracket (3) is shown within the rear bag bracket (5) with the first flange (25) in an exterior position and adjacent to the third flange (35), which is interior to the first flange (25). Alternatively, the second flange (27) is an exterior position and adjacent to the fourth flange (37), which is interior to the second flange (27). The air bag (7), is shown disposed between the front bag bracket (3) and the rear bag bracket (5) and biased towards the first top side (81) and the second top side (103). The shock absorber (123) is shown attached to both the rear bag bracket (5) at the second shock attach slot (119), and the swing arm mount (65). The first pivot axis (23), the second pivot axis (33), the third pivot axis (43), and the fourth pivot axis (63) are shown co-incident. The rear bag bracket (7) pivots about the first pivot axis (23), the second pivot axis (33), the third pivot axis (43), and the fourth pivot axis (63) which correlates to the arcuate motion of the swing arm (9) when the swing arm (9) pivots about the fourth pivot axis (63).

Figure four shows the front bag bracket (3) disposed between the third flange (35) and the fourth flange (37) of the rear bag bracket (5). The swing arm axis tube (75) is shown inserted through the rear bag bracket (5) and the front bag bracket (3). This allows smooth pivoting of the rear bag bracket (5) relative to the front bag bracket (3). The air bag (7) is shown in its mounted position biased towards the first top side (81) of the front bag bracket (3) and the second top side (103) of the rear bag bracket (5).

Figure five shows a cross section of the front bag bracket (3) the rear bag bracket (5) and the air bag (7) in their relative positions.

What is claimed is:

1. A motorcycle suspension system, comprising a motorcycle main frame, said motorcycle main frame having a first hanger and a second hanger, said first and second hangers being essentially flat and parallel, said first hanger having a first lug, and said second hanger having a second lug, said first lug has a first hole defined therein, said second lug having a second hole defined therein, said first hole and said second hole defining a first pivot axis;

a pivoting assembly, said pivoting assembly comprising a front bag bracket, a rear bag bracket, an air bag and a swing arm, said pivoting assembly being located between said first hanger and said second hanger of said motorcycle main frame;

said swing arm having a first side and a second side, said first side and said second side being disposed in a parallel relationship and having an upper support and a lower support to maintain said parallel relationship, said first side and said second side being essentially flat, said first side having a first boss, said first boss being located medially between said upper support and said lower support, and said second side having a second boss, said second boss being medially located between said upper support and said lower support, said first boss having a hole defined therein, and said second boss having a hole defined therein, said holes in said first boss and said second boss defining a fourth pivot axis therebetween, said fourth pivot axis being located co-incident with said first pivot axis, allowing said swing arm to pivotably move in an arcuate manner, said first side and said second side being disposed between said first hanger and said second hanger of said main frame;

said front bag bracket having a frame attach pad, said frame attach pad attaching said front bag bracket to said motorcycle main frame, said front bag bracket having a third pivot axis defined therein, said third pivot axis being co-incident with said first pivot axis positioning said front bag bracket, said front bag bracket is positioned inside said rear bag bracket;

said rear bag bracket being attached to a swing arm mount, said swing arm mount being attached to said lower support of said swing arm, said rear bag bracket having a second pivot axis defined therein, said second pivot axis being co-incident with said first and third pivot axes, and allowing said rear bag bracket to pivot thereabout, said rear bag bracket is pivotably mounted inside said swing arm;

said air bag being made from an elastomeric material and being attached to said front bag bracket and said rear bag bracket, and having the properties of a suspension spring under compressive and extensive loading conditions;

a shock absorber, said shock absorber being mounted to said motorcycle main frame and attached to said rear bag bracket and said swing arm mount located on said swing arm, damping the relative motions of said swing arm and said rear bag bracket;

said swing arm pivots in an arcuate manner about said fourth pivot axis, said rear bag bracket will pivot about said second pivot axis compressing or extending said air bag, said shock absorber will extend or compress damping the relative motion of the swing arm said air bag being located between said front bag bracket and said rear bag bracket, said air bag having means to inflate and deflate; and a swing arm axis tube, said swing arm axis tube being inserted through said first hole in said first lug and said second hole in said second lug of said first and said second hanger, said hole in said first boss of said first side of said swing arm, said hole in said second boss of said second side of said swing arm, a third hole and a fourth hole of said rear bag bracket, and a fifth hole and a sixth hole of said front bag bracket, fixing said front bag bracket and allowing said rear bag bracket and said swing arm to pivotably move, said swing arm axis tube being fixed in place by a pivot bolt and a lock washer located on each side of said swing arm axis tube.

2. The motorcycle suspension system of claim 1, further comprising;

said front bag bracket being attached to said motorcycle main frame, said front bag bracket having a third flange and a fourth flange, said third flange and said fourth flange being disposed in a parallel relationship, a first attach web is disposed between said third flange and said fourth flange maintaining the parallel relationship between said third flange and said fourth flange, said first attach web providing structural stability to said front bag bracket, said third flange having said fifth hole defined therein, and said fourth flange having said sixth hole defined therein, a front bag axis tube, said front bag axis tube being attached to said third flange and said fourth flange and communicating with said fifth hole and said sixth hole, said fifth hole and said sixth hole defining said third pivot axis, said third pivot axis being located co-incident with said first pivot axis, said front bag axis tube additionally providing support for said third flange and said fourth flange; and said rear bag bracket having a first flange and a second flange, said first flange and said second flange being disposed in a parallel relationship, a second attach web is disposed between said first flange and said second flange maintaining the parallel relationship between said first flange and said second flange, said second attach web providing structural stability to said rear bag bracket, said first flange having said third hole defined therein, said second flange having said fourth hole defined thereon, said first flange having a third boss, said third boss defining a seventh hole therein, said seventh hole communicating with said third hole, said second flange having a fourth boss defined thereon, said fourth boss defining an eighth hole therein, said eighth hole communicating with said fourth hole, said third hole, said fourth hole, said seventh hole, and said eighth hole defining said second pivot axis, said second pivot axis being located co-incident with said first pivot axis and said third pivot axis, said third flange and said fourth flange of said front bag bracket being disposed inside said first flange and said second flange of said rear bag bracket, said first flange and second flange being disposed between said first side and said second side of said swing arm, said third boss bearing against said first side of said swing arm, said fourth boss bearing against said second side of said swing arm.

3. The motorcycle suspension system of claim 1 wherein said air bag means for inflating and deflating are by a driver of the motorcycle while stationary, or while in motion.

4. The motorcycle suspension system of claim 3 wherein said means for inflating and deflating said airbag is a driver operated air compressor, said air compressor being attached to said motorcycle main frame.

* * * * *